(12) United States Patent
Stefani et al.

(10) Patent No.: US 7,873,672 B2
(45) Date of Patent: Jan. 18, 2011

(54) EFFICIENT QUERY PROCESSING OF DML SQL STATEMENTS

(75) Inventors: Stefano Stefani, Issaquah, WA (US); Srikumar Rangarajan, Sammamish, WA (US); Marcel van der Holst, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 468 days.

(21) Appl. No.: 12/018,809

(22) Filed: Jan. 24, 2008

(65) Prior Publication Data

US 2009/0193060 A1 Jul. 30, 2009

(51) Int. Cl.
G06F 17/30 (2006.01)
(52) U.S. Cl. ....................... 707/802; 707/687
(58) Field of Classification Search ................. None
See application file for complete search history.

(56) References Cited

U.S. PATENT DOCUMENTS

| | | | | |
|---|---|---|---|---|
| 5,058,002 A | * | 10/1991 | Nakamura et al. ........... | 1/1 |
| 6,567,928 B1 | * | 5/2003 | Lyle et al. ................. | 714/15 |
| 6,615,219 B1 | * | 9/2003 | Bruso et al. ............... | 707/699 |
| 7,383,246 B2 | * | 6/2008 | Lohman et al. ............. | 1/1 |
| 2003/0182276 A1 | * | 9/2003 | Bossman et al. ............ | 707/3 |
| 2005/0060314 A1 | * | 3/2005 | Wang et al. ................ | 707/7 |
| 2005/0234930 A1 | * | 10/2005 | Hop Hing et al. .......... | 707/100 |
| 2009/0182709 A1 | * | 7/2009 | Ritchie et al. ............. | 707/2 |

* cited by examiner

*Primary Examiner*—Mohammad Ali
*Assistant Examiner*—Syed H Hasan (57) ABSTRACT

Various technologies and techniques are disclosed for efficiently processing DML SQL statements through minimal logging and optimized insertions. Rows are inserted into a table in a database in a sorted order. When an insertion of a particular row into the table causes a page split and a new page created during the page split is empty, the new page is locked until an end of a transaction associated with the insertion is completed. When the page split is caused by appending monotonically increasing values at an end of the table, the sorted order will guarantee that the new page is empty. Minimal logging is performed. When the transaction associated with the insertion is completed, a forced checkpoint is performed.

17 Claims, 7 Drawing Sheets

EFFICIENT QUERY PROCESSING OF DML SQL STATEMENTS

BACKGROUND

Databases are used to store the data that is used by one or more software applications. Databases can be managed programmatically through structured query language (SQL) statements. There are generally two majority categories of SQL statements: data definition language (DDL) statements and data manipulation language (DML) statements. DDL statements are SQL statements that are designed to modify the structure of the database. An example of a DDL statement is a CREATE TABLE statement. DML statements, on the other hand, are SQL statements that insert or modify data in the database. An example of a DML statement is an INSERT statement that inserts new rows into one or more tables.

Data in a database is arranged according to a series of tables, with each table having one or columns of data, and one or more rows of data for these columns. Each table typically has one or more columns designated as keys that uniquely identify each row of data so that duplicates are not inserted into the same table. Keys are different from indexes, however. Indexes are designed to allow quick lookups of data in the tables. Data columns that are part of a key can also be used as indexes to the data, allowing rows to be located more quickly. Columns of data that are not actually keys can also serve as an index to the data, such as when that column contains data that is frequently accessed. A more detailed discussion on indexes will now be provided for the sake of background.

Indexes in a database are analogous to an index in the back of a printed book. When you want to locate a certain topic in a book, you look for a certain known word in an index, and the index then tells you the page number where that topic is located. An index in a database serves a similar function, and allows a computer to look up data in a table that matches a given index value.

Indexed columns in a database table are usually stored in an index structure called a B-Tree, but could also be in another type of table structure. A B-Tree maintains an ordered set of data that allows for a given index value to be quickly retrieved, deleted, and/or inserted. A B-Tree contains node records that point to other node records. To search the B-Tree to retrieve a value, the tree is traversed from node to node until the desired value is located, or because there are no more paths in the tree to search. A B-Tree structure is generally a much more efficient way of locating data than to search in sequential order to locate the desired value, especially when a large volume of data is present, which is usually the case with indexes.

When rows are inserted into a table in a database, index values for those inserted rows of data also need created. Thus, in addition to inserting the complete row into the table itself, an entry is also inserted into the table structure (e.g. B-Tree, etc.) that stores the indexed values for newly inserted rows. When a large number of new values need inserted into a table at once, the process of adding the new values can be much slower than when just a few values are being inserted.

SUMMARY

Various technologies and techniques are disclosed for efficiently processing DML SQL statements through minimal logging and optimized insertions. Rows are inserted into a table in a database in a sorted order. When an insertion of a particular row into the table causes a page split and a new page created during the page split is empty, the new page is locked until an end of a transaction associated with the insertion is completed. When the page split is caused by appending monotonically increasing values at an end of the table, the sorted order will guarantee that the new page is empty. Minimal logging is performed. When the transaction associated with the insertion is completed, a forced checkpoint is performed.

In one implementation, a method for efficiently processing DML SQL statements through optimized insertions and minimal logging is described. A request is received to process one or more SQL statements that insert a plurality of data into one or more indexes in a table in a database. The data is sorted into a sorted list of data. The SQL statements are processed to perform optimized insertions of the data into the table using the sorted list of data. For each row insertion into the table that causes a page split where a new page is empty, minimal logging is performed to log the page as a whole.

In another implementation, a method for enabling and disabling a database optimization that uses optimized insertions and minimal logging is described. When an optimizer determines that a sufficient number of rows will be inserted into a table to benefit from an optimization using optimized insertions and minimal logging, then the optimization is activated, thereby causing new insertions to be performed in a sorted order, with minimal logging. When the optimizer determines that an insufficient number of rows will be inserted into the table to benefit sufficiently from the optimization, then the optimization is deactivated, thereby causing new insertions to be performed in an unsorted order, with normal logging.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as techniques for optimizing insertions into databases, but the technologies and techniques also serve other purposes in addition to these. In one implementation, one or more of the techniques described herein can be implemented as features within a database program such as MICROSOFT® SQL Server, or from any other type of program or service that manages insertions into database tables.

In one implementation, techniques are disclosed for providing optimizations that can improve the performance of insertions made into a table in a database. The term "table" as used herein is meant to include a database structure that stores data in the database. The optimizations can include optimized insertions and minimal logging. "Optimized insertions" means that the rows being inserted into the table are made without having to perform a full table traversal to locate the proper page to record the data. This is described in further detail in FIGS. 3-5 herein. The term "minimal logging" as used herein is meant to include the logging of something less than what would be logged for each record individually. An example of minimal logging would be to log the complete page as a whole instead of logging individual inserts. Another example of minimal logging would be to log nothing, but to ensure that the pages that have new rows on them get flushed to disk at the correct time. The exact type of minimal logging can vary depending on the database recovery mode that is in use for a given database. Minimal logging is described in further detail in FIGS. 3 and 6-7 herein. The system can use various criteria to determine when these optimizations are beneficial, as described in further detail in FIG. 2.

Figure 1:
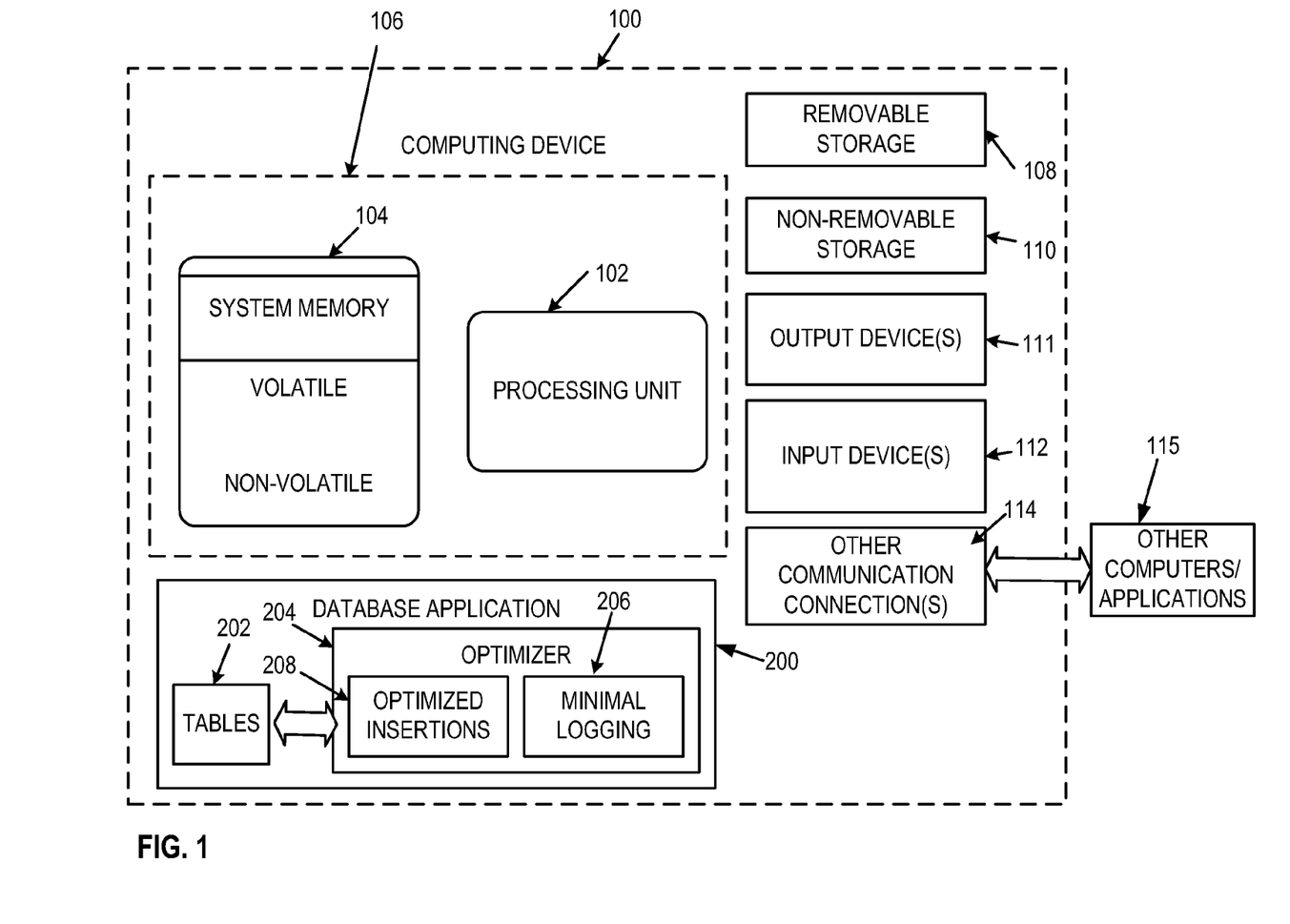
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here.

In one implementation, computing device 100 includes database application 200. Database application 200 includes database tables 202, as well as an optimizer 204. Tables 202 are responsible for storing rows and columns of data for the values in the database. Tables 202 can include tables that are responsible for storing data of the other tables (such as index data, etc.). In one implementation, optimizer 204 has a minimal logging module 206 and an optimized insertion module 208. Optimizer 204 can also have additional features and functionality than just those shown in FIG. 1, such as logic for determining when to use the minimal logging module 206 and the optimized insertion module 208. Minimal logging module 206 is responsible for performing a minimum amount of logging when certain types of insertions are made into tables to update indexes for one or more tables. The operations that are performed by minimal logging module 206 are described in further detail in FIGS. 2-3, and 6-7 herein. Optimized insertions module 208 is responsible for performing the insertions into a given table using the optimized insertion techniques when such insertions are determined beneficial. The operations that are performed by optimized insertions module 208 are described in further detail in FIGS. 2-5 herein. In one implementation, by using optimized insertions module 208 in combination with minimal logging module 206, the optimizer 204 is able to improve the performance of the insertion of data values (e.g. index values or otherwise) being made in a given table.

Figure 2:
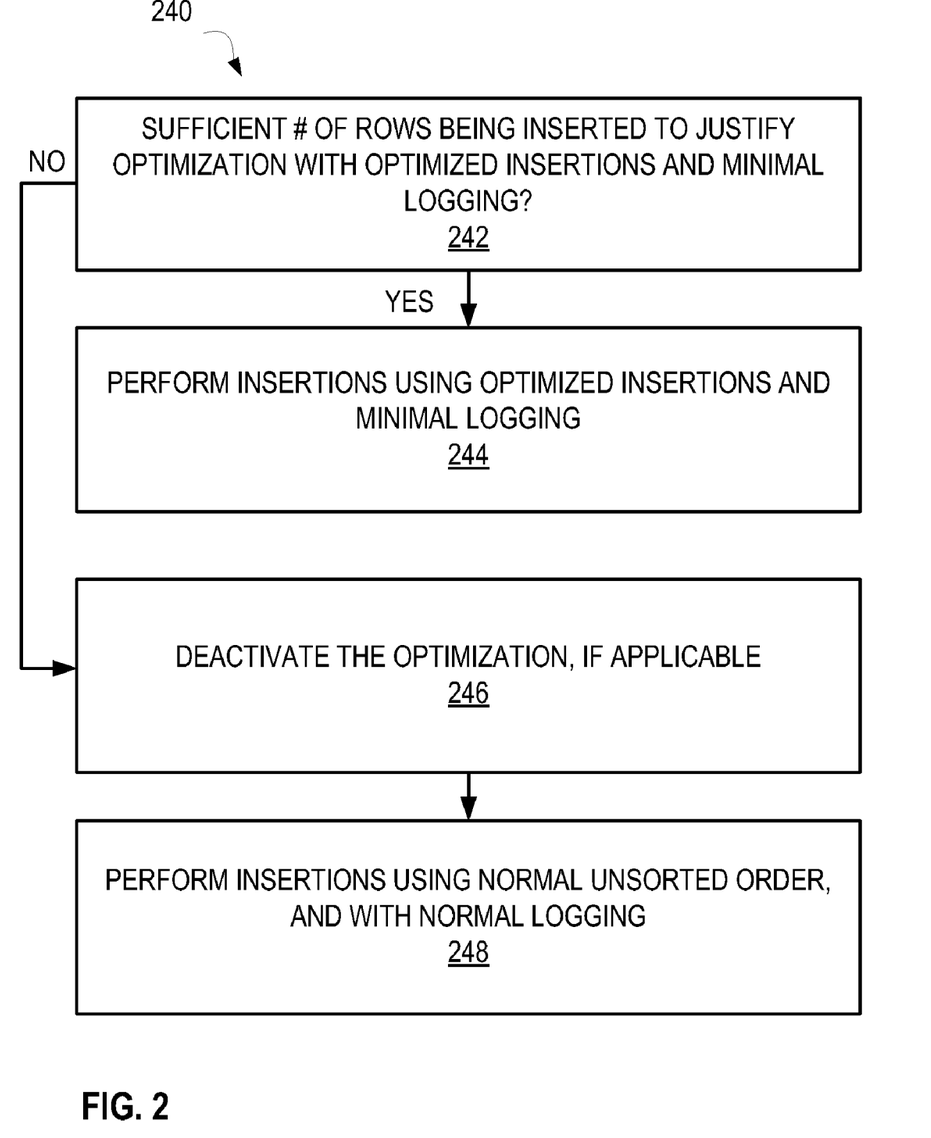
FIG. 2 is a process flow diagram for one implementation illustrating the high level steps involved in using optimized insertions and minimal logging for table insertions.

Turning now to FIGS. 2-7 with continued reference to FIG. 1, the steps for implementing one or more implementations of database application 200 are described in further detail. In some implementations, the processes of FIG. 2-7 are at least partially implemented in the operating logic of computing device 100. FIG. 2 is a process flow diagram 240 for one implementation illustrating the high level steps involved in using optimized insertions and minimal logging for table insertions. An optimizer determines if there are a sufficient number of rows being inserted into a table to justify an optimization involving optimized insertions and minimal logging (decision point 242). The number of rows that it takes for the optimizer to deem that number "sufficient" can be determined by any number of ways, such as a number chosen by the optimizer using heuristics, a setting specified by a database administrator, or through any of numerous other means as would occur to one skilled in the computer software art.

If the number of rows is determined to be sufficient to justify the optimization (decision point 242), then the insertions into the table are performed using the optimized insertion process and the minimal logging process (step 244), as described in further detail in FIGS. 3-7 herein. If an insufficient number of rows are being inserted to justify the optimization (decision point 242), then the optimization is deactivated if it was previously activated (step 246), and the insertions are performed using the normal unsorted order of rows and with normal (full) logging (step 248). In other words, in such a scenario, the optimization is not used. This means that rows get inserted into the table in the normal unsorted order that the data values occur in the insert statement(s). Normal logging means whatever logging is in use without the optimization, which is most likely full logging so that point-in-time recovery of the database can be performed. However, a logging mode other than full logging could also be used in this scenario.

An example of how an optimizer might determine whether to use the optimized version with optimized insertions and minimal logging will be described to further illustrate the concepts of FIG. 2. The optimizer can compare statistics of the current data distribution inside the table against the data distribution of the values about to be inserted. If the new values that will be inserted belong to a boundary currently empty inside the table, or a boundary beyond the current limit, then the inserts can be performed in the sorted order with minimal logging. If however, the data is distributed randomly (as opposed to contiguous groups of data), then the optimizer may choose to avoid the optimization and use the normal unsorted order without minimal logging. Optimized insertion and minimal logging will now be described in further detail in FIGS. 3-7.

Figure 3:
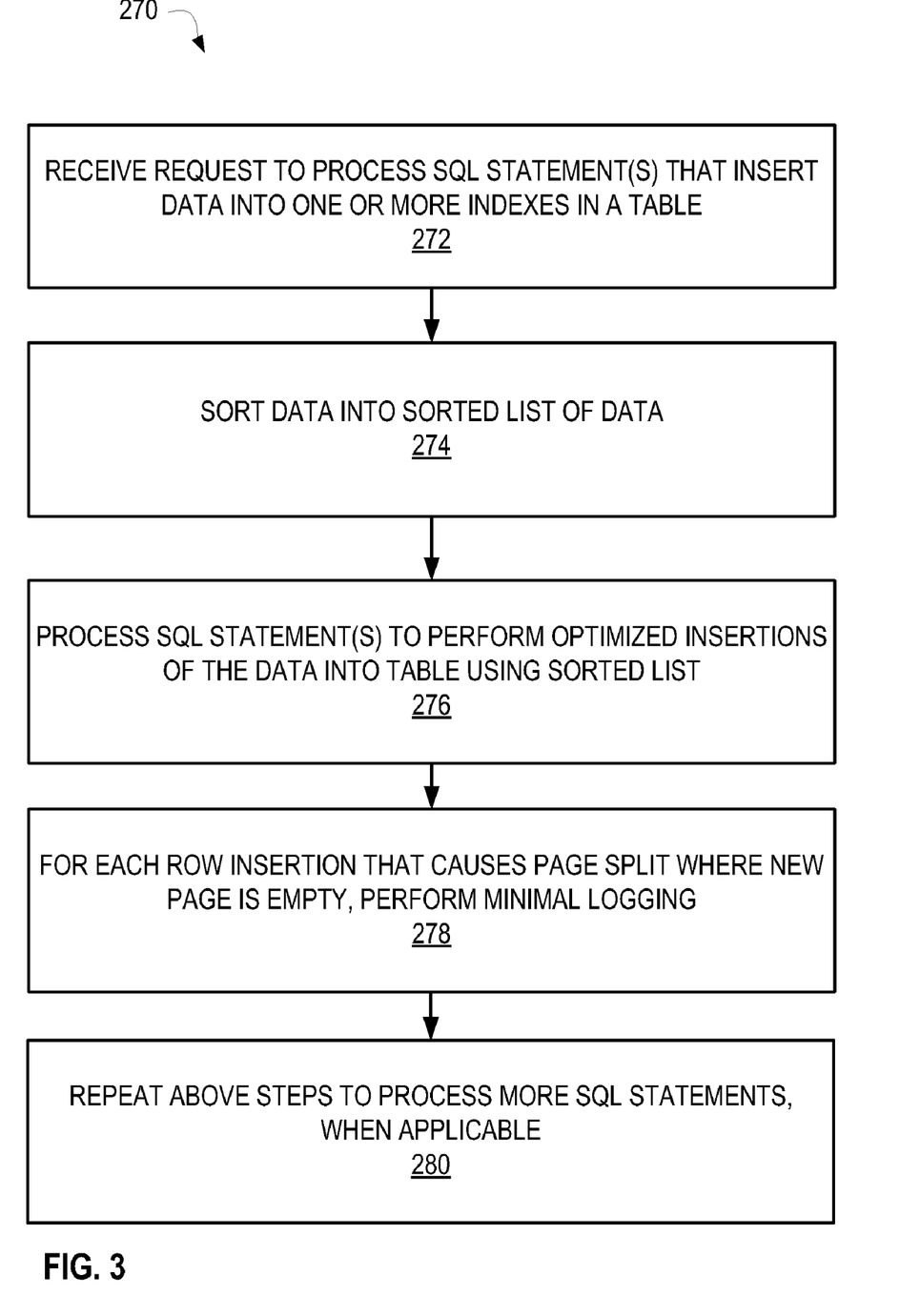
FIG. 3 is a process flow diagram for one implementation illustrating the steps involved in using optimized insertions and minimal logging for table insertions.

FIG. 3 is a process flow diagram 270 for one implementation illustrating the steps involved in using optimized insertions and minimal logging for table insertions. The process of FIG. 2 applies when a setting or determination to use optimized insertions and minimal logging have been activated/made, either as an explicit setting, programmatically determined, or otherwise determined. A request is received by a database engine to process one or more SQL statements that insert data into one or more indexes in a table (step 272). The data to be inserted into the table is first sorted into a sorted list of data (step 274). In one implementation, the sorted order is in alphabetical, ascending order. The SQL statement(s) are processed to perform the optimized insertions of the data into a table using the sorted list of data (step 276). In other words, the order in which the data gets inserted into the table is the order in which the data appears in the newly sorted list of data (as opposed to the original unsorted list of the data for insertion). For each row insertion of data into the table that causes a page split where the new page is empty, minimal logging is performed (step 278). A page split is when a new page is allocated in the table because the particular page in the table is full. As noted previously, when that new page is empty, then minimal logging is performed. Minimal logging is described in further detail in FIGS. 6-7. Steps 272-278 are then repeated as applicable to process more SQL statements for inserting data into a table for one or more indexes.

Figure 4:
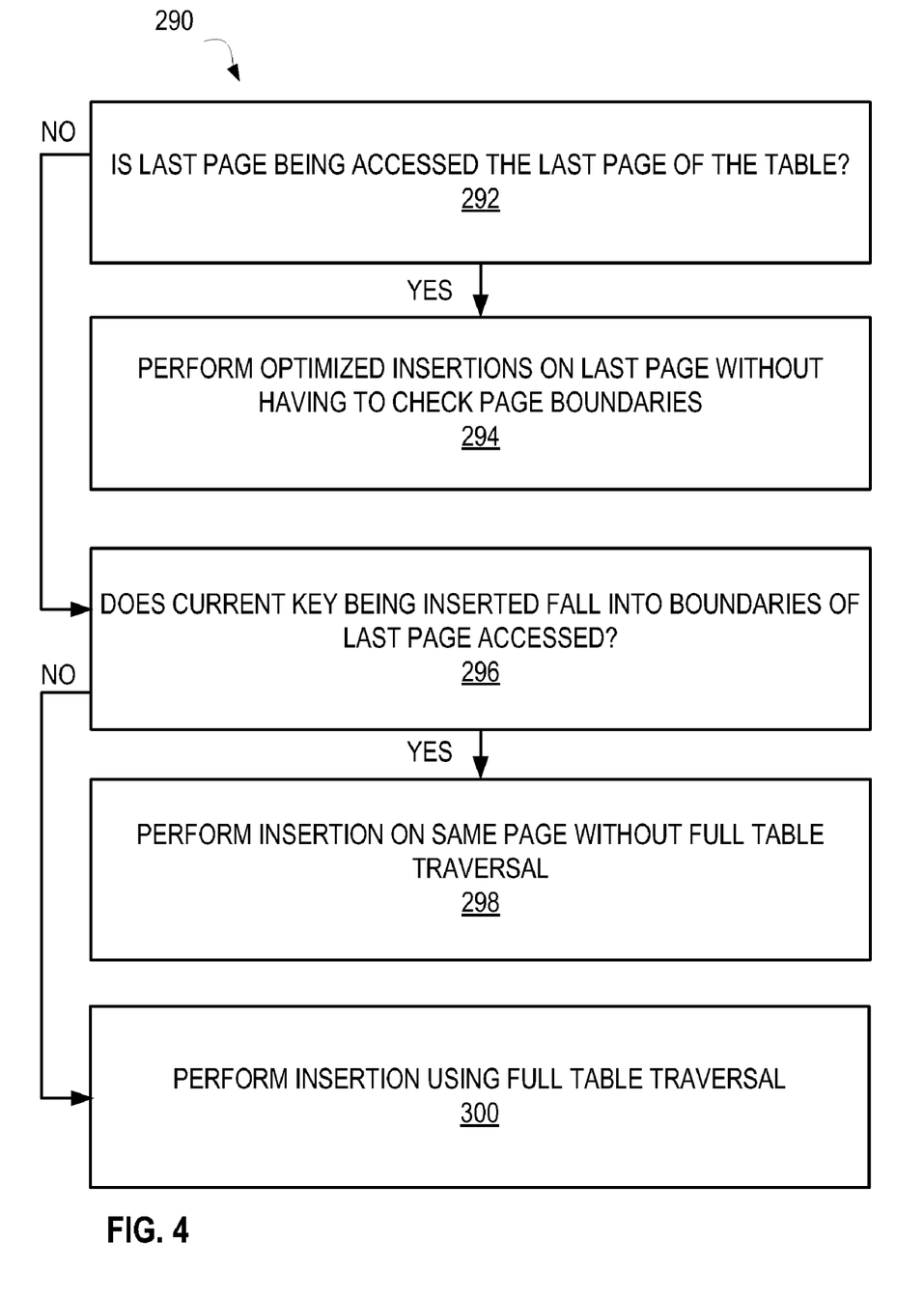
FIG. 4 is a process flow diagram for one implementation of the system of FIG. 1 illustrating the steps involved in performing optimized insertions.

Turning now to FIG. 4, is a process flow diagram 290 is shown for one implementation illustrating the steps involved in performing optimized insertions. If the last page being accessed in the table is the last page of the table (decision point 292), then optimized insertions are performed on the last page without having to check any page boundaries (step 294). In other words, since the last page being inserted to is already the last page of the table, and since the key values being inserted are in sorted order, the system knows that the current key value to be inserted is in a higher order than the last key value that was inserted. That is why it is unnecessary to check the page boundaries to make sure the new key value being inserted will fit. The system just knows it will fit given these other factors and can save system resources by avoid unnecessary boundary checking.

However, if the last page being accessed is not the last page of the table (decision point 292), then the system checks to see if the current key being inserted falls into the boundaries of the last page that was accessed (decision point 296). If so, then the insertion is performed on the same page without having to do a full table traversal (step 298). This type of insertion can be less expensive in system resources than performing a table traversal, especially given that the key values are in a sorted order. However, if the current key being inserted does not fall into the boundaries of the last page that was accessed (decision point 296), then the insertion is performed using a full table traversal (step 300).

Figure 5:
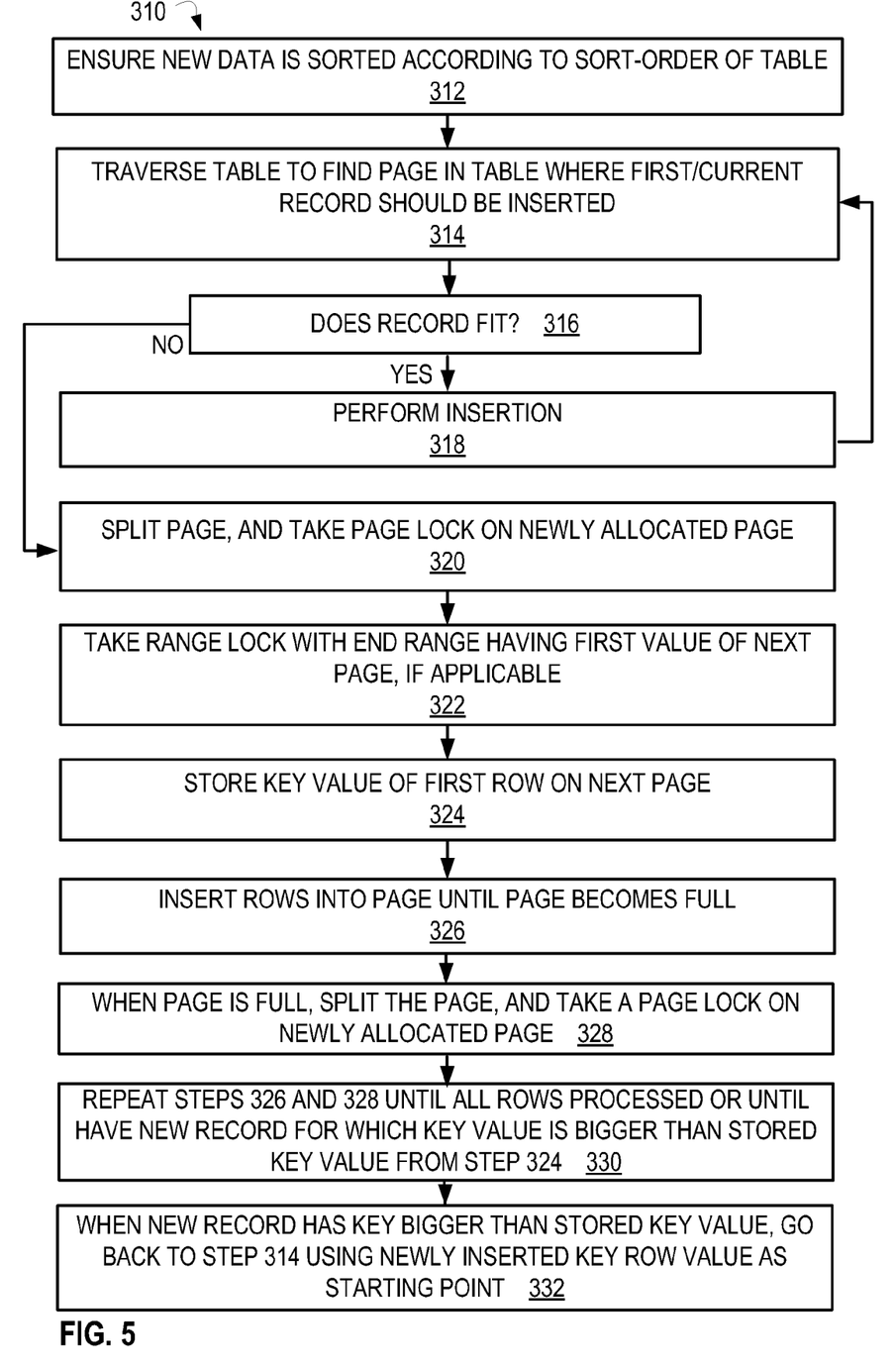
FIG. 5 is a process flow diagram for one implementation illustrating the more detailed steps involved in performing optimized insertions.

FIG. 5 is a process flow diagram 310 for one implementation illustrating the more detailed steps involved in performing optimized insertions. The system ensures that new data to be inserted into the table is sorted according to the sort-order of the table (step 312). As noted earlier, this can be an ascending, alphabetical order, but it could also be something different. One important point for this and other figures using the optimizations described herein is that the data being inserted into the table first be sorted into the same order as the data that already exists in the table. The table is traversed to find a page in the table where the first record should be inserted (step 314). If the record fits (decision point 316), then the insertion is performed (step 318), and the table traversal is performed for the next record (step 314). If the record does not fit (decision point 316), then the page is split, and a page lock is taken on the newly allocated page (step 320). A range lock is taken with the end range having the first value of the next page, if applicable (step 322). In other words, if there is no next page, then no range lock is taken, since the page lock on the last page in the table will be sufficient to guarantee that no one else can insert new data. The value of the first row on the next page is stored (step 324), or the fact that the value is unlimited is there is no next page.

Rows are inserted into the page until it becomes full (step 326). When the page is full, the page is split, and a page lock is taken on the newly allocated page (step 328). Steps 326 and 328 are repeated until all rows that need inserted in the table are processed, or until a new record is being inserted for which the key value is bigger than the stored key value from step 324. When the new record has a key bigger than the stored key value, the steps repeat from step 314 using the newly inserted key row value as the starting point.

Figure 6:
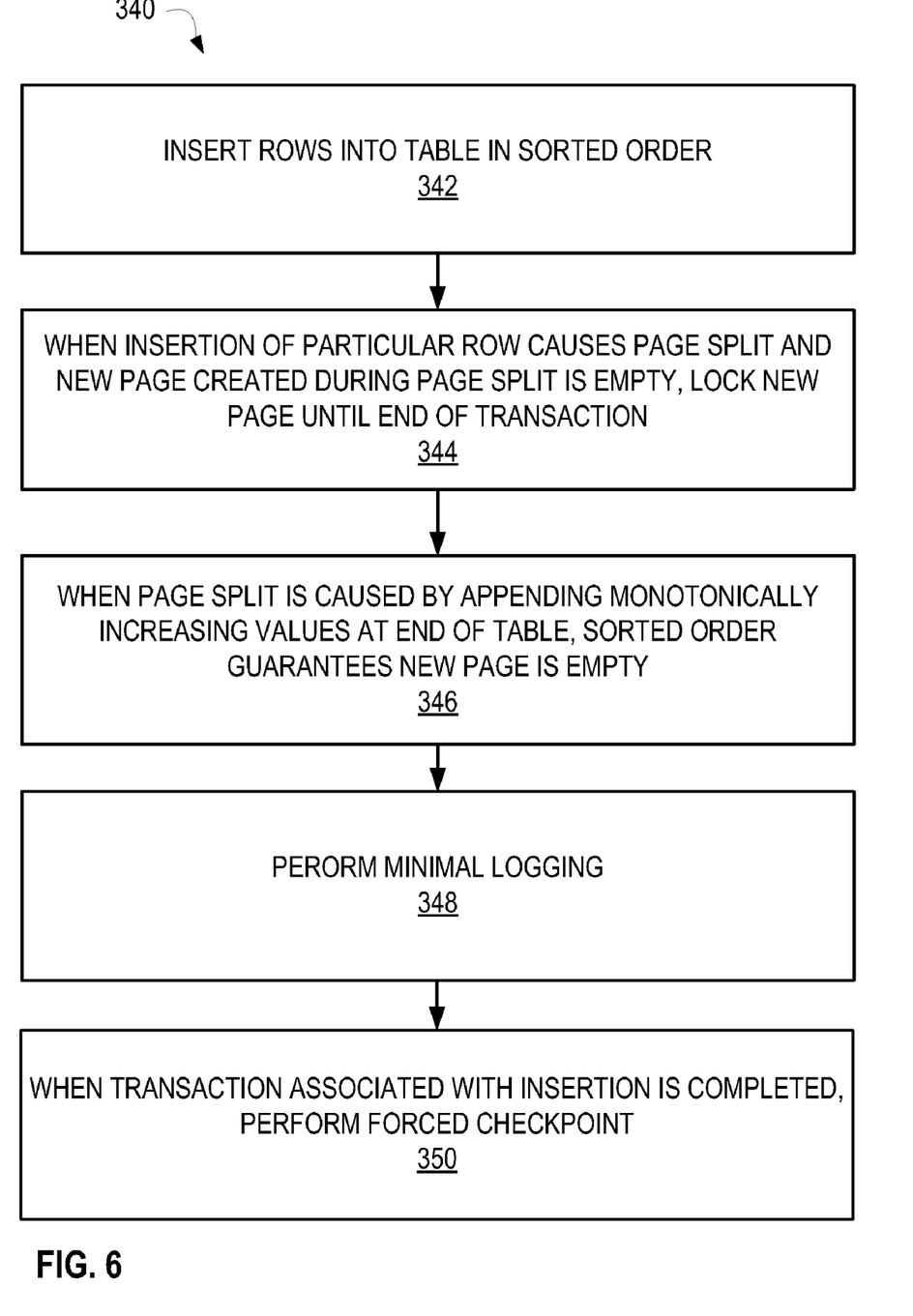
FIG. 6 is a process flow diagram for one implementation illustrating the steps involved in performing minimal logging.
Figure 7:
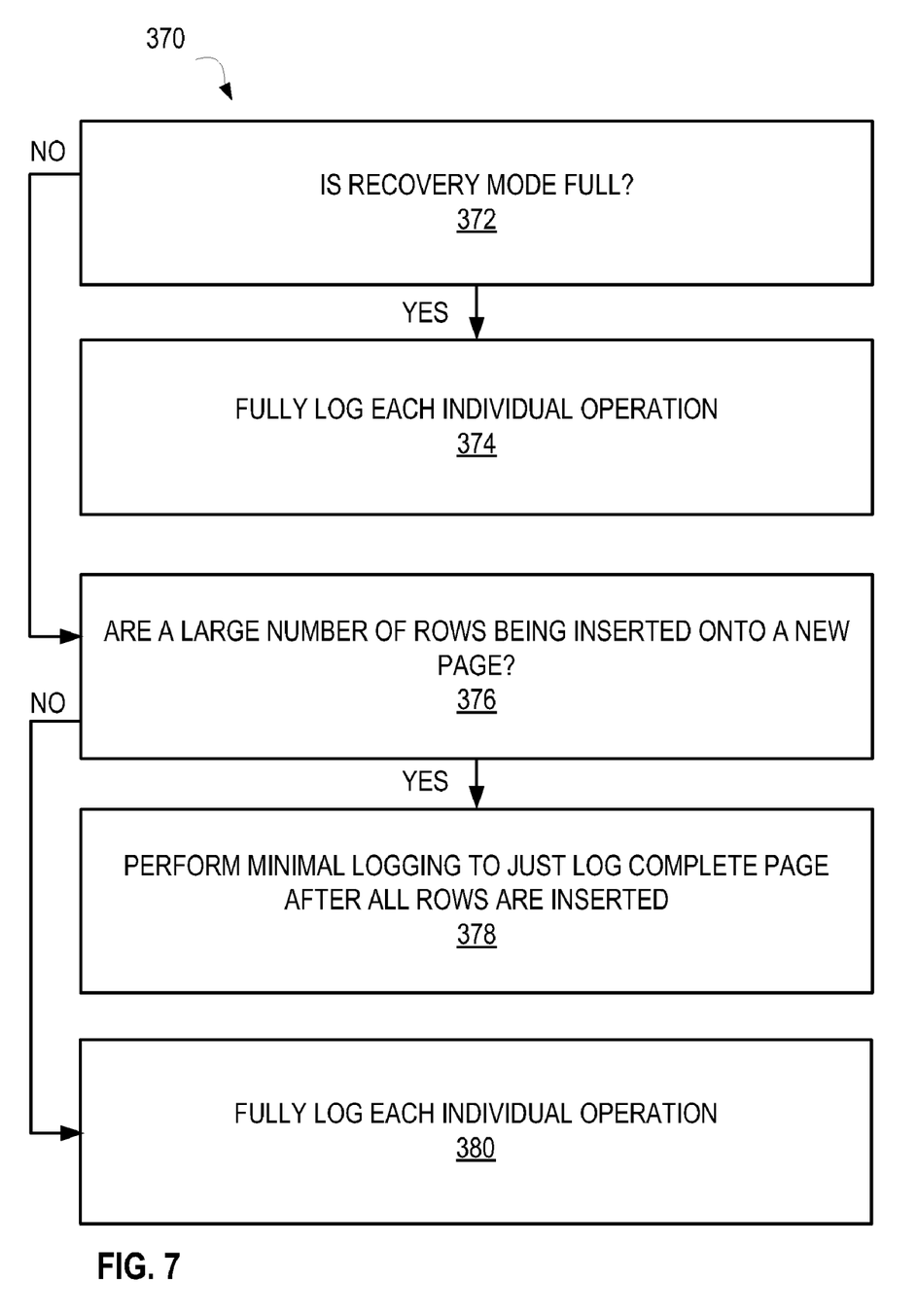
FIG. 7 is a process flow diagram for one implementation of the system of FIG. 1 illustrating the steps involved in performing full logging versus minimal logging.

Turning now to FIGS. 6-7, some implementations describing how minimal logging can be performed are described in further detail. FIG. 6 is a process flow diagram 340 illustrating the steps involved in performing minimal logging for one implementation. Rows are inserted into a table in a sorted order that matches the order of the table (step 342). When the insertion of a particular row into the table causes a page split and the new page created during the page split is empty, then the new page is locked until the end of the transaction associated with the insertion (step 344). This locking ensures that no concurrent connections can insert rows within the same new page. When the page split was caused by appending monotonically increasing values at the end of the table, then the sorted order guarantees that the new page is empty (step 346).

Minimal logging is then performed (step 348), as opposed to logging the individual records the page contains. In one implementation, the type of minimal logging can depend on the recovery mode of the database. As one non-limiting example, if full recovery mode is turned on, then the new page is logged as a whole, and if simple recovery mode is turned on, then the new page is force-flushed to disk. Since the page was initially empty and accessed exclusively, in order to roll back, it will be sufficient to just delete all of the rows that the new page contains. When a transaction associated with the insertion is completed, then a forced checkpoint is performed (step 350). During a forced checkpoint, the dirty data pages are flushed to disk, and depending on the recovery mode of the database, the transaction log may also be truncated. In other words, the page log records can be leaner because they will only contain the information necessary to do an UNDO operation or to recover back to where the system was at in the event of a crash (but not sufficient information to recover to a particular point-in-time).

FIG. 7 is a process flow diagram 370 for one implementation of the system of FIG. 1 illustrating the steps involved in performing full logging versus minimal logging. If the database is in full recovery mode where point-in-time recovery is desired (decision point 372), then each individual insertion into the table is logged (step 374). If, however, the database is in a simple recovery or a bulk log mode (something other than full recovery), then the system checks to see if a large number of rows are being inserted onto a new page (decision point 376). As noted previously, the number that the optimizer determines is "sufficient" can be determined in any number of ways. The point is that if the optimizer determines a large enough number of rows are being inserted (decision point 376), then minimal logging is performed to just log the complete page after all rows are inserted (step 378). If the large enough number of rows are not being inserted to justify the optimization (decision point 376), then each individual operation is fully logged Oust as in full recovery mode) (step 380).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer storage medium having computer-executable instructions for causing a computer to perform steps comprising:
  inserting a plurality of rows into a table in a database in a sorted order using at least one processing unit, the table including a plurality of pages and each page including at least one row of the plurality of rows, by selecting from among first, second, and third insertion types based on one or more of whether a previous page is a last page in the table or whether a key of a first row of the plurality of rows is within boundaries of the previous page, including:
    if the previous page is the last page in the table, inserting the plurality of rows into the table in the database in the sorted order without traversing the table and without checking boundaries of the previous page using the key of the first row of the plurality of rows in accordance with the first insertion type,
    if the previous page is not the last page in the table and if the key of the first row of the plurality of rows is within boundaries of the previous page, inserting the plurality of rows into the table in the database in the sorted order by accessing the previous page without traversing the table in accordance with the second insertion type, and
    if the previous page is not the last page in the table and if the key of the first row of the plurality of rows is not within the boundaries of the previous page, inserting the plurality of rows into the table in the database in the sorted order by traversing the table in accordance with the third insertion type;
  when an insertion of a particular row into the table causes a page split, creating a new page during the page split;
  if the new page is empty, locking the new page until an end of a transaction associated with the insertion is completed;
  performing minimal logging; and
  when the transaction associated with the insertion is completed, performing a forced checkpoint.

2. The computer storage medium of claim 1, wherein the forced checkpoint is operable to flush dirty data pages to disk.

3. The computer storage medium of claim 1, wherein information still remains in the database that would allow an UNDO operation to be performed.

4. The computer storage medium of claim 1, further having computer-executable instructions for causing a computer to perform steps comprising:
  dynamically disabling use of the inserting, locking, performing minimal logging, and performing the forced checkpoint steps when a query optimization analyzer determines that the use of the inserting, locking, performing minimal logging, and performing the forced checkpoint steps will not provide a desired level of performance improvements.

5. The computer storage medium of claim 4, wherein while the inserting, locking, performing minimal logging, and performing the forced checkpoint steps are dynamically disabled, the rows are instead inserted into the table in an unsorted order and with full logging.

6. The computer storage medium of claim 4, wherein the use of the inserting, locking, performing minimal logging, and performing the forced checkpoint steps are disabled when the query optimization analyzer determines that the rows are contained in random groups of data as opposed to contiguous groups of data.

7. The computer storage medium of claim 1, wherein the new page is locked until the end of the transaction to prevent concurrent connections from inserting rows within the new page.

8. The computer storage medium of claim 1, further having computer-executable instructions for causing a computer to perform steps comprising:
  when performing a rollback operation, deleting all rows contained in the new page at the time of the rollback operation.

9. A method for efficiently processing DML SQL statements through optimized insertions and minimal logging comprising the steps of:
  receiving a request to process one or more SQL statements that insert a plurality of rows of data into one or more indexes in a table in a database, the table including a plurality of pages and each page including at least one row of the plurality of rows;
  sorting the plurality of rows into a sorted list of rows of data;
  processing the SQL statements to perform optimized insertions of the plurality of rows into the table using the sorted list of rows, using at least one processing unit, by selecting from among a first type of optimized insertion, a second type of optimized insertion, and a non-optimized insertion based on one or more of whether a previous page is a last page in the table or whether a key of a first row of the plurality of rows is within boundaries of the previous page, including:
    if the previous page is the last page in the table, performing the first type of optimized insertion, including inserting the plurality of rows into the table in the database in the sorted order without traversing the table and without checking boundaries of the previous page using the key of the first row of the plurality of rows,
    if the previous page is not the last page in the table and if the key of the first row of the plurality of rows is within boundaries of the previous page, performing the second type of optimized insertion, including inserting the plurality of rows into the table in the database in the sorted order by accessing the previous page without traversing the table, and if the previous page is not the last page in the table and if the key of the first row of the plurality of rows is not within boundaries of the previous page, not performing an optimized insertion and performing the non-optimized insertion instead; and for each row insertion into the table that causes a page split where a new page is empty, performing minimal logging.

10. The method of claim 9, further comprising:

repeating the receiving, sorting, processing, and performing steps for a plurality of SQL statements.

11. The method of claim 9, wherein the minimal logging is only performed if the database is operating in a simple recovery mode.

12. The method of claim 9, further comprising:

when a transaction associated with a given one of the SQL statements is committed, a forced checkpoint is performed.

13. The method of claim 12, wherein during the forced checkpoint, dirty data pages are flushed to disk.

14. A method for enabling and disabling a database optimization that uses optimized insertions and minimal logging comprising the steps of:

when an optimizer determines that a sufficient number of rows will be inserted into a table to benefit from an optimization using optimized insertions and minimal logging, the table containing a plurality of pages and each page containing one or more rows, activating the optimization using at least one processing unit, thereby causing new insertions to be performed in a sorted order, with minimal logging, by selecting from among first, second, and third insertion types based on one or more of whether a previous page is a last page in the table or whether a key of a first row of the plurality of rows is within boundaries of the previous page, including:

if the previous page is the last page in the table, inserting the plurality of rows into the table in the database in the sorted order without checking boundaries of the previous page using the key of the first row of the plurality of rows in accordance with the first insertion type, if the previous page is not the last page in the table and if the key of the first row of the plurality of rows is within boundaries of the previous page, inserting the plurality of rows into the table in the database in the sorted order by accessing the previous page without traversing the table in accordance with the second insertion type, and if the previous page is not the last page in the table and if the key of the first row of the plurality of rows is not within boundaries of the previous page, inserting the plurality of rows into the table in the database in the sorted order by traversing the table in accordance with the third insertion type; and when the optimizer determines that an insufficient number of rows will be inserted into the table to benefit sufficiently from the optimization, then deactivating the optimization, thereby causing new insertions to be performed in an unsorted order, with normal logging.

15. The method of claim 14, wherein during minimal logging, pages of data are logged as a whole.

16. The method of claim 15, wherein when using minimal logging, when a transaction associated with a given insert operation is committed, a forced checkpoint is performed.

17. The method of claim 16, wherein during the forced checkpoint, dirty data pages are flushed to disk.

* * * * *